June 20, 1933.  G. PIRINOLI  1,914,786
VALVE
Filed Sept. 23, 1931

Inventor,
Guglielmo Pirinoli
By Sommers & Young
Attys

Patented June 20, 1933

1,914,786

UNITED STATES PATENT OFFICE

GUGLIELMO PIRINOLI, OF TURIN, ITALY, ASSIGNOR TO FIAT SOCIETÁ ANONIMA, OF TURIN, ITALY

VALVE

Application filed September 23, 1931, Serial No. 564,649, and in Italy January 17, 1931.

This invention refers to valves for internal combustion engines, more particularly of the air-cooled type for aircraft and its object is to provide an improved construction of said valves for the purpose of improving and accelerating the cooling thereof.

According to this invention the valve is provided with a core of a good heat-conducting material, i. e. aluminium, said core extending from the head to the opposite stem end, so as to rapidly transmit heat outwards by conduction and radiation.

The drawing shows by way of example two constructional forms of the valve according to this invention.

Figure 1:
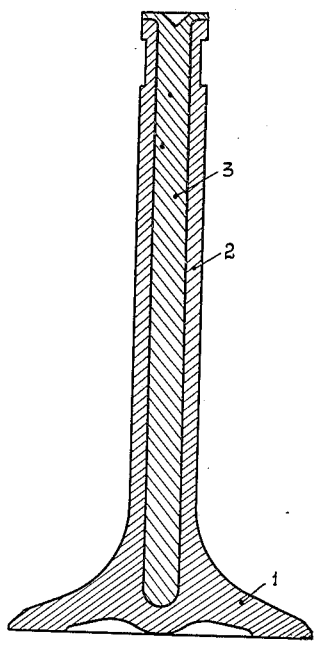
Figure 1 is an axial section of the first construction.

Referring to Figure 1, 1 denotes the head and 2 the stem of a valve for an internal combustion engine. The stem 2 is provided with an axial bore extending from the free end of the stem in proximity to the surface of the valve head; this hole is filled with a material 3 which is a good heat-conductor, e. g. it is filled with an aluminium rod fixed in position by any suitable means. The rod may, e. g. be driven into the hole or welded.

By this arrangement the heat yielded to the head by the combustion gases is rapidly transmitted by conduction to the stem portion, of which the surface is exposed to the outer air, a wide heat-radiating surface and therefore a quick cooling of the valve body being thus obtained.

Figure 2:
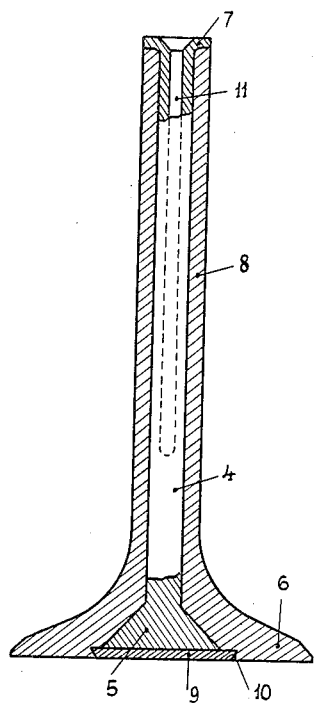
Figure 2 is an axial section of the second construction.

A more efficient heat dispersion is obtained by the construction shown in Fig. 2, in which the core 4 of a good heat-conducting material comprises a conical head 5 lodged in a correspondingly shaped recess formed in the valve head 6. The core 4 is fixed in position by bending over the end 7 of the core on the free end of the valve stem 8. The head 5 is protected against direct contact with the combustion gases by a disk 9 having a bevelled edge 10, which is introduced into its seat and clamped therein by upsetting the undercut edge of the seat on the bevelled disk edge.

The radiation of heat towards the outside can be improved by enlarging the radiating surface of the stem by boring in the core an axial hole 11.

What I claim is:

1. Valve more particularly for internal combustion engines, comprising a head having a conical recess with an undercut edge, a hollow stem, a core of a good heat-conducting material forced into said conical recess and into the bore of said stem, and a protecting disk with a bevelled edge clamped in said undercut edge.

2. A valve, more particularly for internal combustion engines comprising a head having a recess with undercut edge, a hollow stem, an aluminium core forced in said recess and into the bore of said stem and a protecting disc with a bevelled edge clamped in said undercut edge.

3. A valve, more particularly for internal combustion engines, comprising a head having a recess with undercut edge, a hollow stem, a core provided with a head of good heat-conducting material fitted in said recess and into the bore of said stem, a flange at the core end applied to the free end of the stem to secure said core in place and a protecting disc with a bevelled edge clamped in said undercut edge.

4. A valve, more particularly for internal combustion engines, comprising a head having a conical recess with an undercut edge, a hollow stem, a core with an aluminium head fitted in said recess and bore of said stem, a flaring at the core end extending on the free end of the stem to secure said core in place and a protecting disc with a bevelled edge clamped in said undercut edge.

5. A valve, more particularly for internal combustion engines, comprising a head having a recess with an undercut edge, a hollow stem, a core provided with a head of good heat-conducting material fitted in said recess and bore of said stem, said core having an axial bore communicating freely with the exterior, a flaring at the hollow end of said core extending on the free end of the stem for securing the core in place and a protecting disc with a bevelled edge clamped in said undercut edge.

In testimony whereof, I hereunto affix my signature.

GUGLIELMO PIRINOLI.